US008666553B2

(12) United States Patent  
Phillips et al.

(10) Patent No.: US 8,666,553 B2  
(45) Date of Patent: Mar. 4, 2014

(54) LINE INSPECTION ROBOT AND SYSTEM

(75) Inventors: Andrew John Phillips, Harrisburg, NC (US); J. Mark Major, San Antonio, TX (US); Glynn R. Bartlett, Boerne, TX (US)

(73) Assignee: Electric Power Research Institute, Inc., Charlotte, NC (US)

( * ) Notice: Subject to any disclaimer, the term of this patent is extended or adjusted under 35 U.S.C. 154(b) by 458 days.

(21) Appl. No.: 13/024,520

(22) Filed: Feb. 10, 2011

(65) Prior Publication Data

US 2011/0196535 A1    Aug. 11, 2011

Related U.S. Application Data

(60) Provisional application No. 61/303,046, filed on Feb. 10, 2010.

(51) Int. Cl.
*B25J 13/08* (2006.01)
*B60K 16/00* (2006.01)
*B61B 7/00* (2006.01)

(52) U.S. Cl.
USPC ............................................. 700/259; 901/1

(58) Field of Classification Search
USPC ......... 700/259; 901/1, 44, 47; 104/112, 117.1
See application file for complete search history.

(56) References Cited

U.S. PATENT DOCUMENTS

| 4,163,480 | A | * | 8/1979 | Highland ........................ 182/14 |
| 4,492,168 | A | * | 1/1985 | Cellai ............................. 105/30 |
| 4,904,996 | A | * | 2/1990 | Fernandes ................ 340/870.07 |
| 5,103,739 | A | * | 4/1992 | Sawada et al. .................. 105/30 |
| 6,494,141 | B2 | * | 12/2002 | Montambault et al. ........ 104/112 |
| 7,496,459 | B2 | * | 2/2009 | McAllister et al. ............. 702/59 |
| 7,634,966 | B2 | * | 12/2009 | Pouliot et al. ................. 104/112 |
| 7,872,371 | B2 | * | 1/2011 | Varley et al. .................. 307/10.1 |
| 8,239,064 | B2 | * | 8/2012 | Park et al. ...................... 700/258 |
| 2001/0015149 | A1 | * | 8/2001 | Montambault et al. ........ 104/112 |
| 2006/0114122 | A1 | * | 6/2006 | Jones ....................... 340/870.07 |
| 2008/0249723 | A1 | * | 10/2008 | McAllister et al. ............. 702/59 |
| 2008/0276823 | A1 | * | 11/2008 | Montambault et al. .... 104/173.1 |

OTHER PUBLICATIONS

Toussaint, K., Pouliot, N., Montambault, S., "Transmission Line Maintenance Robots Capable of Crossing Obstacles: State-of-the-Art Review and Challenges Ahead", Journal of Field Robotics, 2009, pp. 477-499, vol. 26, No. 5. Canada.
Kim, Y., Yi, B., Song, J., Shin, J., Lee, J., "Implementing a Prototype System for Power Facility Management Using RFID/WSN", International Journal of Applied Mathematics and Computer Sciences, 2006, pp. 70-75, vol. 2, No. 2, Korea.
Nayyerloo, M., Chen, X., Wang, W. Chase, J., "Cable-Climbing Robots for Power Transmission Lines Inspection", Mobile Robots-State of the Art in Land, Sea, Air, and Collaborative Missions, 2009, pp. 63-84, I-Tech Education and Publishing, Vienna.

* cited by examiner

*Primary Examiner* — Jason Holloway
(74) *Attorney, Agent, or Firm* — Trego, Hines & Ladenheim, PLLC (57) ABSTRACT

The present invention relates to an overhead transmission line inspection robot and system for inspecting transmission line components and right of way conditions. The overhead transmission line inspection robot includes a communications and control system adapted to control the robot and transmit information and a drive system for propelling the robot along a shield wire to enable inspection over a large area. The robot further includes a camera adapted to inspect right of way and component conditions; a light detection and ranging (LiDar) sensor adapted to measure conductor position, vegetation, and nearby structures; and a global positioning system adapted to identify the robot's position and speed.

13 Claims, 9 Drawing Sheets

FIG. 13

LINE INSPECTION ROBOT AND SYSTEM

This application claims the benefit of Provisional Application No. 61/303,046 filed on Feb. 10, 2010.

BACKGROUND OF THE INVENTION

The present invention relates generally to a line inspection system and, more particularly, to an overhead electric transmission line inspection robot and system for inspecting transmission line components and right of way conditions.

Overhead electric transmission lines are one of the most diversely located assets within the utility industry, traversing thousands of miles, often in remote conditions. Increased reliability requirements, aging components, right of way inspections compliance, and budget constraints increase the need for thorough, timely, and cost effective inspections along the entire length of transmission lines.

BRIEF SUMMARY OF THE INVENTION

Accordingly, there is a need for an overhead transmission line inspection robot and system that provides automated remote inspection and monitoring of transmission line components, clearances, and right of way conditions, as well as, getting to the location of unexpected failures quickly to provide real-time information to operators.

According to one aspect of the present invention, an overhead transmission line inspection robot includes a communications and control system adapted to control the robot and transmit information; a drive system for propelling the robot along a shield wire to enable inspection over a large area, a camera adapted to inspect right of way and component conditions; a light detection and ranging (LiDar) sensor adapted to measure conductor position, vegetation, and nearby structures; and a global positioning system adapted to identify the robot's position and speed.

According to another aspect of the present invention, an overhead transmission line inspection system includes a line inspection robot having a communications and control system adapted to control the robot and transmit information, a drive system for propelling the robot along a shield wire to enable inspection over a large area, and an inspection system adapted to inspect right of way and component conditions. The system also includes a diverter system installed on support structures to allow the robot to traverse the structures, the diverter system having a plurality of track supports to allow the robot to disengage the shield wire traverse the structure and reengage the shield wire.

According to another aspect of the present invention, an overhead transmission line inspection system includes a line inspection robot adapted to inspect an overhead transmission line, and a plurality of sensors positioned along the overhead transmission line, wherein the sensors collect data on the health of the overhead transmission line and its components, and wherein when the robot is in close proximity to a sensor, the sensor transmits the data to the robot for analysis.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
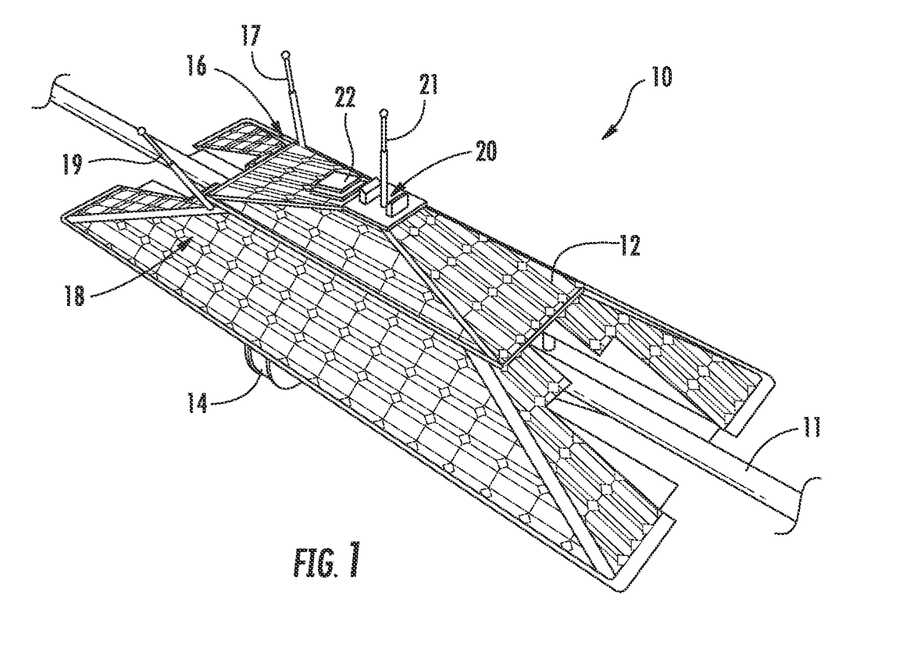
FIG. 1 shows a line inspection robot according to an embodiment of the invention.

Referring to the drawings, an exemplary inspection robot for inspection of overhead transmission lines according to an embodiment of the invention is illustrated in FIG. 1 and shown generally at reference numeral 10. The robot 10 is designed to traverse overhead transmission lines to collect high fidelity information that utilities can immediately act on. The robot 10 travels on a shield wire 11 and identifies high risk vegetation, right of way encroachment, and component conditions using a variety of inspection technologies.

As shown, the robot includes solar panels 12 for harvesting energy from the sun to recharge batteries (not shown) that power the robot, thereby providing power for motion, communications, inspection sensors, and processing. While only solar panels are shown, it should be appreciated that other sources of power harvesting may be used. It should further be appreciated that more than one power harvesting source may be used at one time to create a hybrid system. In addition to solar panels 12, the following power harvesting solutions may be used:

1. A plurality of charging stations positioned on structures dispersed along the line may be used to charge the batteries of the robot 10. The charging stations would charge slowly over a period of weeks into a battery using technologies such as electric field, magnetic field, solar, wind, thermal difference, and vibration so that when the robot 10 docks, energy from the charging stations is transferred to the robot's 10 battery;
2. The robot 10 may also be charged using E-field. In this scenario, a "Plate" is positioned below the robot which capacitively couples the E-field from the energized phases and continuously charges the battery;
3. The robot 10 may be charged using magnetic fields. If the shield wire is grounded to structures, currents will be flowing in the wire due to an imbalance in the phase currents. The power from this current will be harvested using an inductor or current transformer and sent to the battery for charging; and
4. In the case where the shield wire is insulated (one or both sides), the robot 10 will move to a structure where a shield wire insulator is and electrically bridge the gap to the structure either with an impedance or a dead short.

This will cause currents to flow. The currents and voltages will be developed and used to charge the battery. The robot 10 then progresses with its inspection duties until the robot's 10 battery needs recharged, at which time the robot 10 moves to the next available structure where the robot 10 charges itself again.

Figure 2:
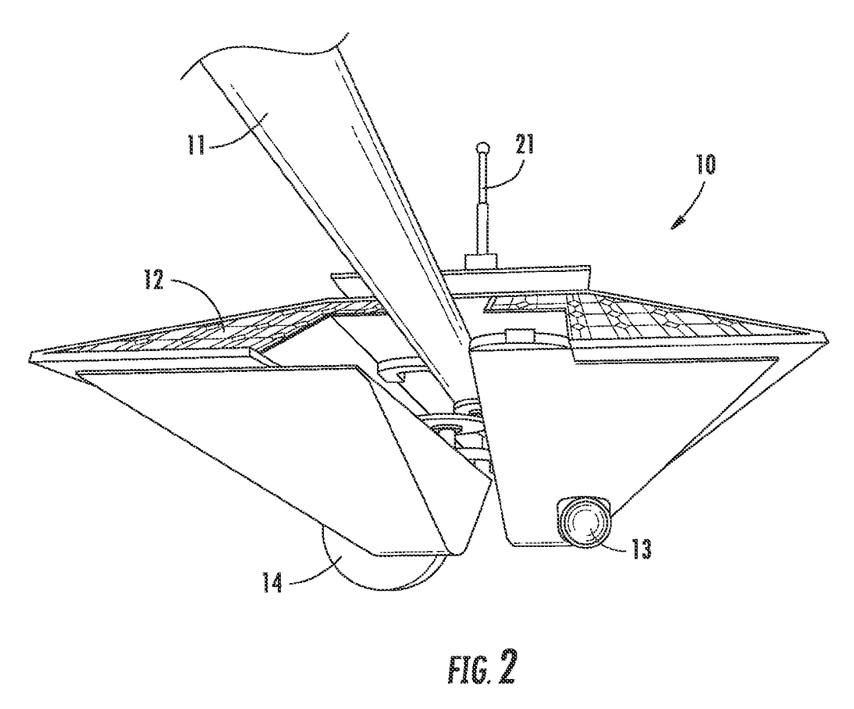
FIG. 2 shows a camera attached to a bottom of the inspection robot of FIG. 1.
Figure 3:
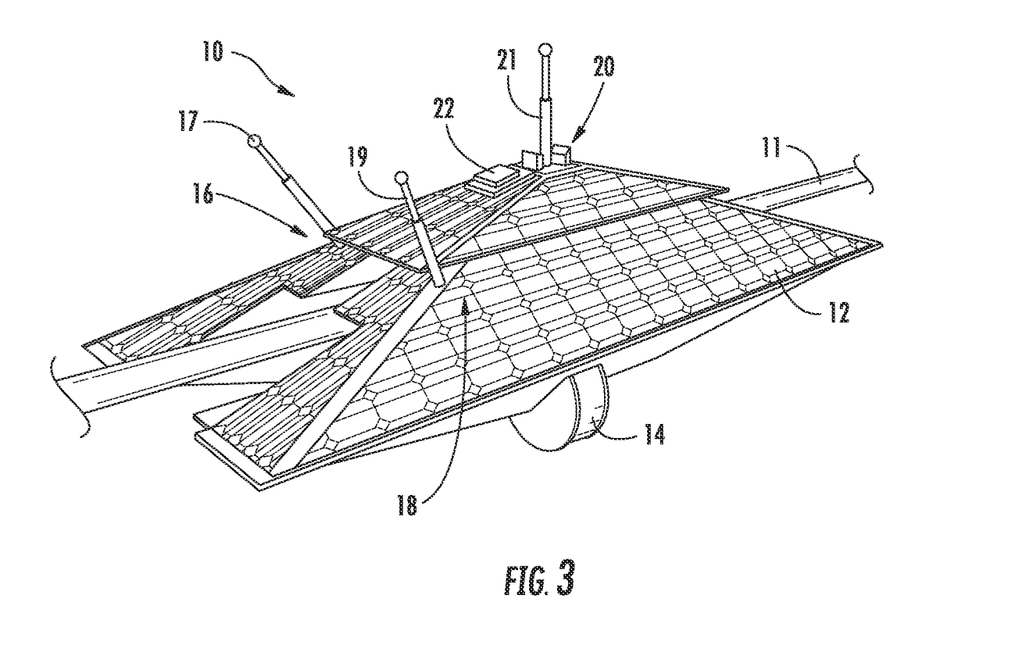
FIG. 3 shows a perspective view of the inspection robot of FIG. 1.
Figure 4:
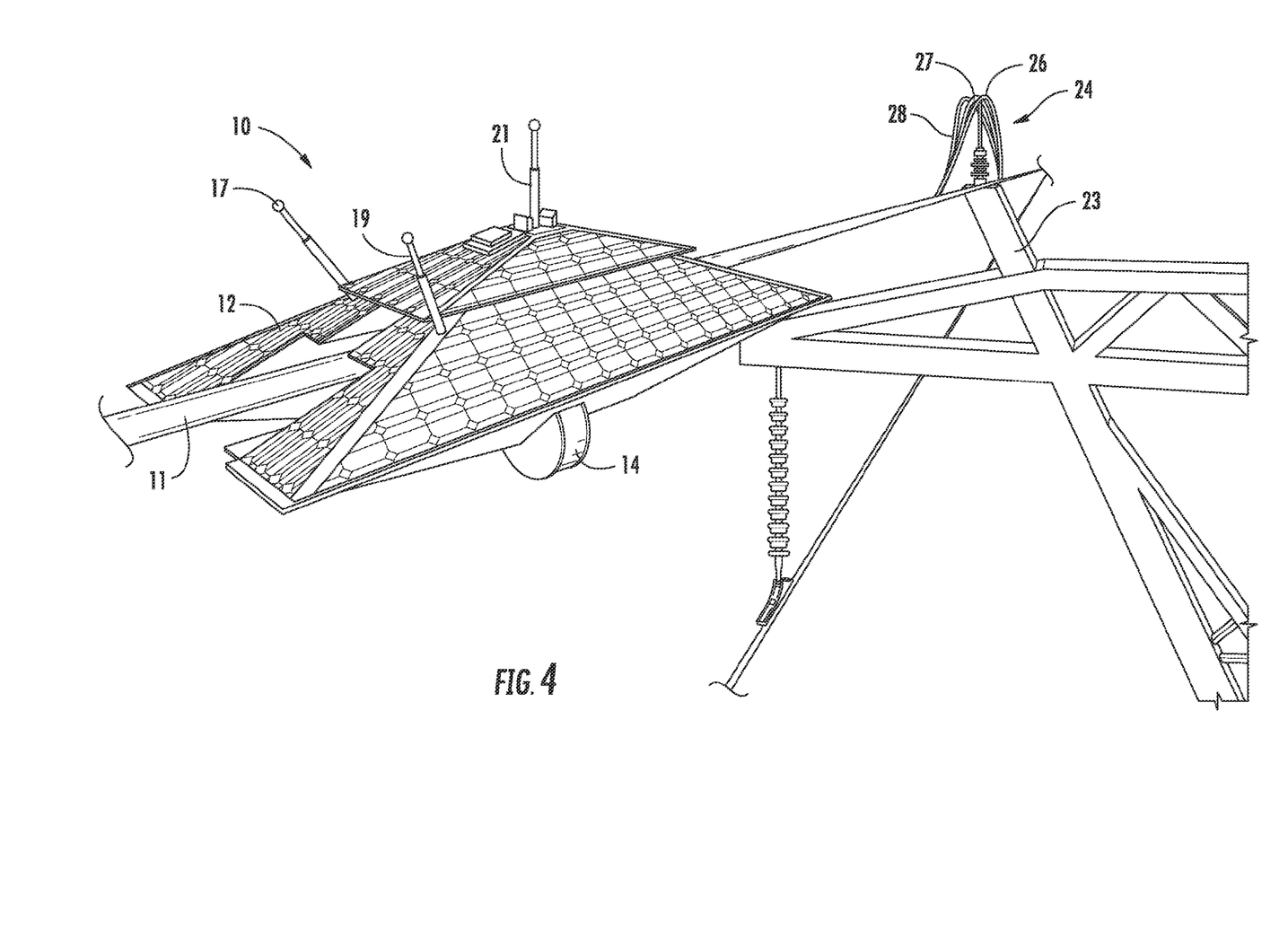
FIG. 4 shows the inspection robot of FIG. 1 approaching a diverter according to an embodiment of the invention.

Referring to FIGS. 2 and 3, the robot 10 includes various sensors and transmitters to enable the robot 10 to provide accurate and up-to-date information to utilities. The robot includes a high definition camera 13 with vision processing to inspect right of way and component conditions, an optical infrared camera to identify hot spots on transmission line components, a ultraviolet camera to identify the location of unwanted corona and arcing, a microphone to identify location of birds and other potential issues, a Light Detection and Ranging (LiDar) sensor 14 for measuring conductor position, vegetation, and nearby structures, a communications and control system 16 having an antenna 17, a sensor reading system 18 having an antenna 19 to collect data from remote sensors deployed at strategic positions along a transmission line, an electromagnetic interference detection system 20 having an antenna 21 for identifying nearby corona or arcing discharge activity, and a global positioning system (GPS) 22 for identifying the robot's 10 position and speed.

The communications and control system 16 transmits key information to a systems operator and provides control options. The robot 10 is designed to travel autonomously on a preprogrammed path and transmit data back wirelessly about the condition of the line and the robot 10 to the systems operator. The robot 10 collects data and processes the data on board, and then transmits only key results back to the operator. Operators may download more detailed data upon request to the robot 10. The robot 10 also allows a remote operator to give it commands to move to a specific site or location, take specific actions such as move back and forth, and take specific images, etc. The location and speed of the robot is determined using the onboard GPS system 22.

Under normal circumstances, the robot 10 traverses the shield wire 11 at a speed that conserves power while performing a very detailed assessment. The objective is to provide an inspection which exceeds or at minimum is equivalent to a comprehensive hovering helicopter inspection. In the event that a problem is detected in an overhead transmission line, an operator may speed up the robot 10 and send the robot 10 to the detected problem for inspection. Further, if a wind speed sensor on the robot 10 determines that the wind speed is too great or if an internal temperature sensor determines that the internal temperature of the robot 10 is too high, the robot 10 may shut itself down to prevent damage.

As shown in FIGS. 4-7, the robot 10 travels along the shield wire 11 to enable simpler traversing of structures 23, easier maintenance, and reduced impact of electric and magnetic fields. A diverting system 24 is installed on each structure 23 during construction to enable the robot 10 to traverse the structure 23. The diverting system 24 includes a plurality of track supports 26-28 to allow the robot to disengage from the shield wire 11, engage the supports 26-28, and re-engage the shield wire 11. As shown, the supports 26-28 are connected to the shield wire 11 at opposite sides of the structure 23. The supports 26-28 merge together at the point of connection to the shield wire 11 and expand as the supports 26-28 traverse the structure 23.

Figure 5:
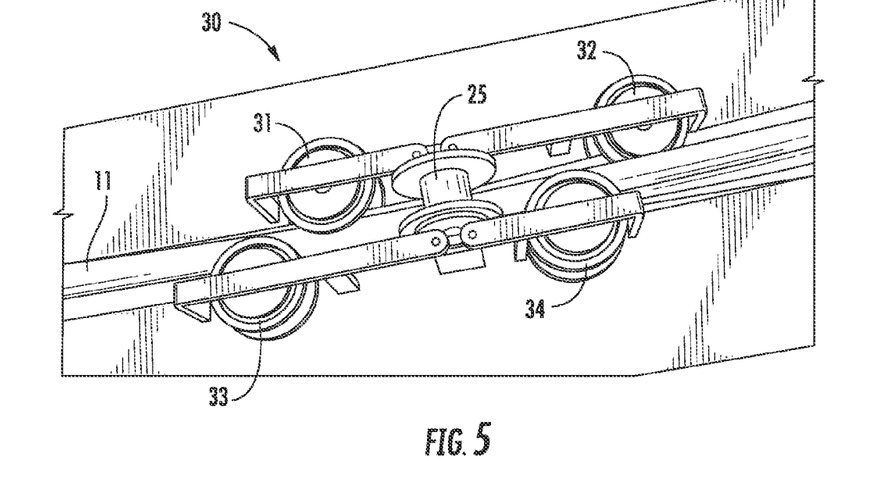
FIG. 5 shows a drive system of the inspection robot of FIG. 1.
Figure 6:
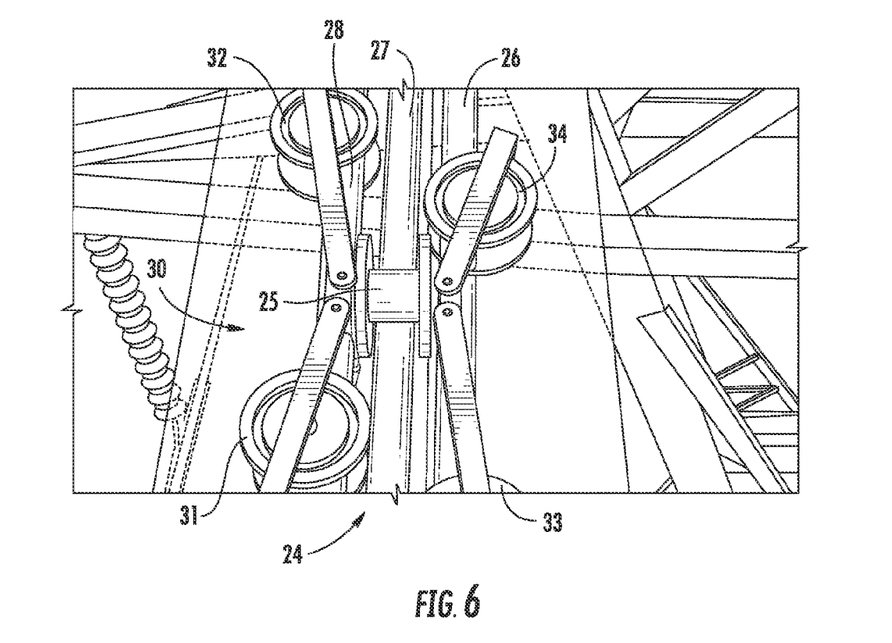
FIG. 6 shows the drive system of FIG. 5 expanding about the diverter of FIG. 4.
Figure 7:
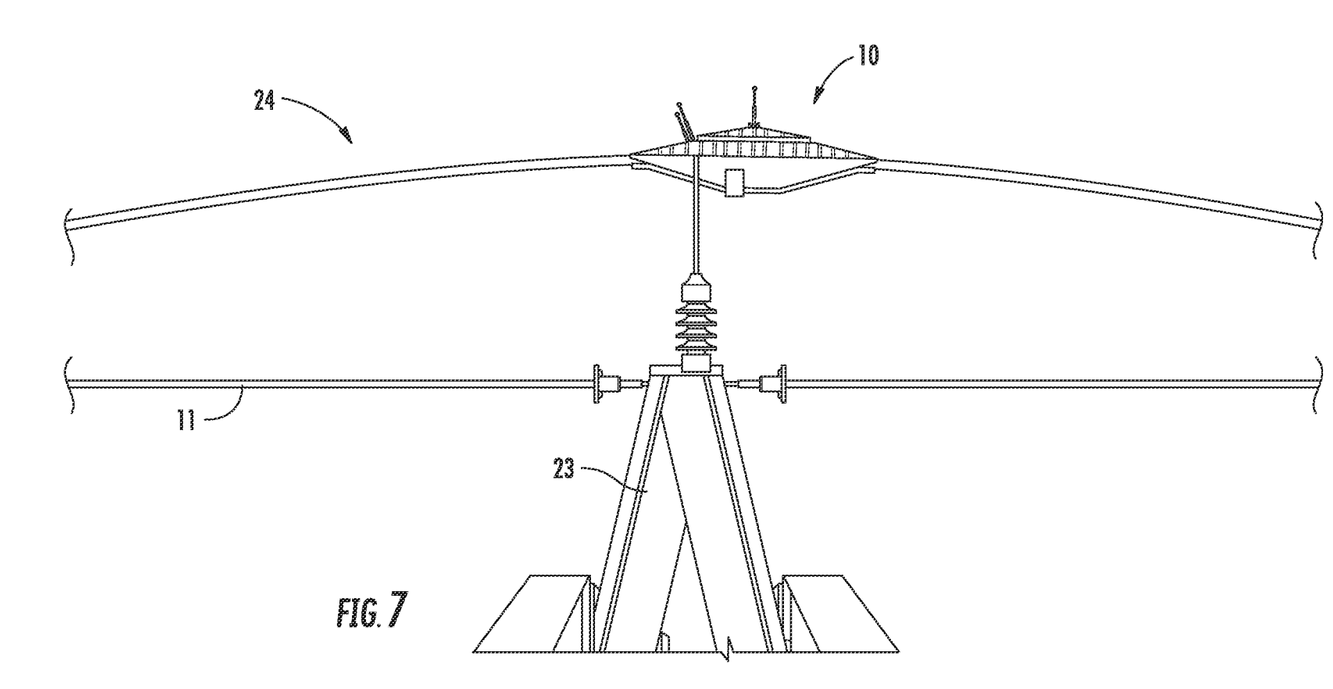
FIG. 7 shows the inspection robot of FIG. 1 traversing a structure along the diverter of FIG. 4.

As illustrated in FIGS. 5 and 6, when the robot 10 approaches the structure 23, drive system 30 disengages the shield wire 11 and engages the diverting system 24. The drive system 30 includes a plurality of spring-loaded wheels 31-34 for engaging opposing sides the shield wire 11 and the diverting system 24. The spring-loaded wheels 31-34 operate independently of each other. As shown, each of the wheels 31-34 is pivotally attached to a center guide 25 that runs along the shield wire 11. This configuration allows each of the wheels 31-34 to move from a normal running position, FIG. 5, to an expanded position, FIG. 6, when needed. As the robot 10 engages the diverting system 24, the drive system 30 expands to release itself from the shield wire 11 and engage supports 26 and 28. Once the robot 10 has traversed the structure 23, the drive system disengages supports 26 and 28 and reengages the shield wire 11. This approach reduces the complexity of the robot and allows the robot to easily traverse the structure 23. It also reduces power requirements and does not require complex control systems, thereby increasing reliability.

Figure 8:
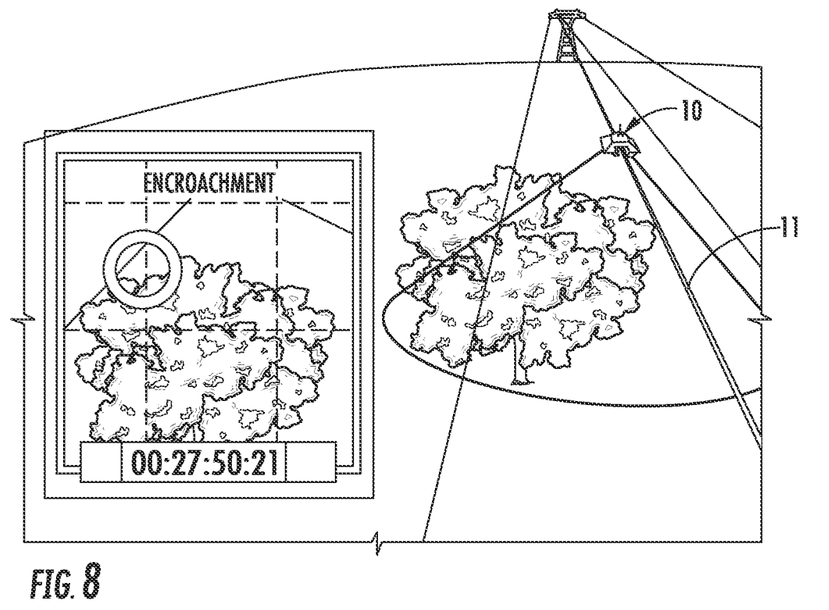
FIG. 8 shows the camera of FIG. 2 checking encroachments.
Figure 9:
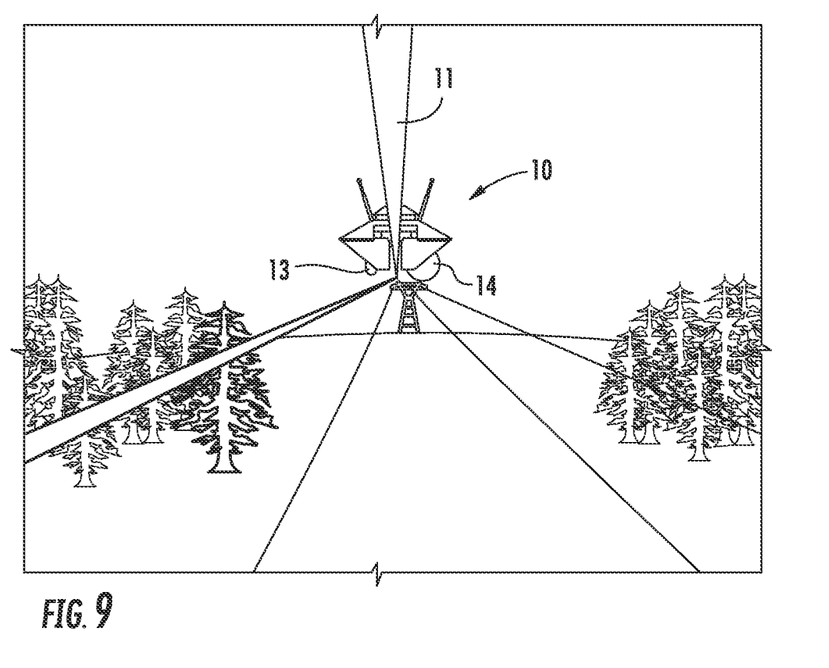
FIG. 9 shows a LiDar system checking encroachments.

Referring to FIGS. 8 and 9, two methods of right of way inspection are shown. Both methods may be used individually or together at the same time. The first method, FIG. 8, uses the high definition camera 13 to take images and parallax measurements at multiple locations to determine clearances to trees and other objects in the right of way. Information from the camera 13 is processed and transmitted via the communications and control system 16. The second method, FIG. 9, uses LiDar to measure directly the location of conductors and vegetation on the right of way. Information from the LiDar is processed and transmitted via the communications and control system 16. The GPS 22 provides the location of any right of way issues to a system operator or repair personnel.

Figure 10:
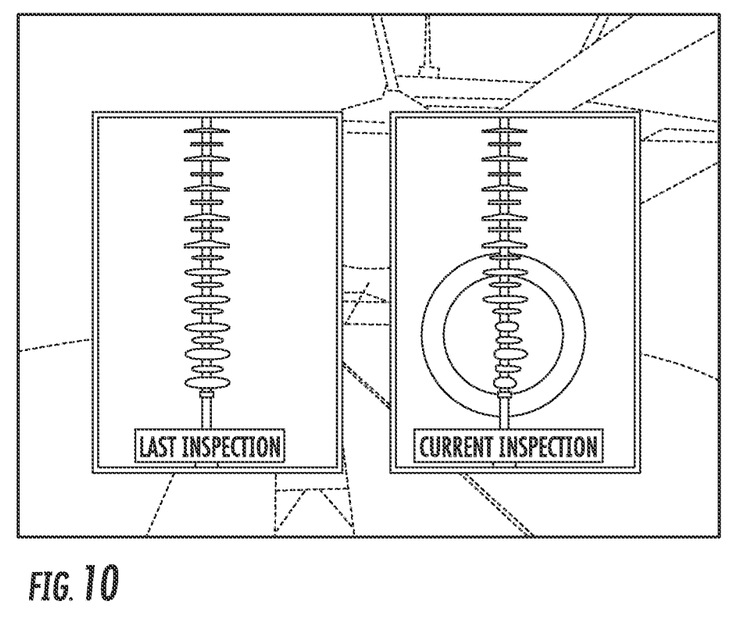
FIG. 10 shows images obtained by the camera of FIG. 2 for checking the condition of transmission line components.
Figure 11:
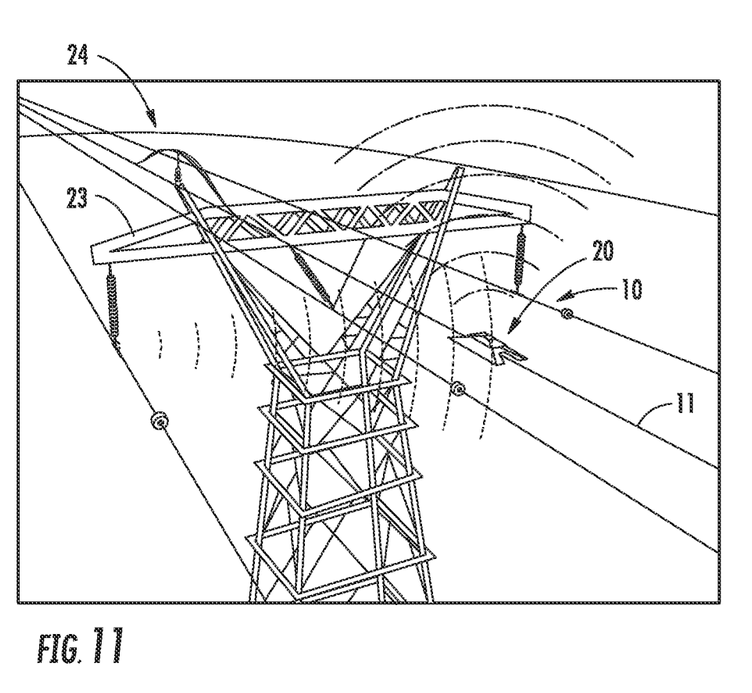
FIG. 11 shows an electromagnetic discharge sensor identifying discharge activity.

As illustrated in FIGS. 10 and 11, two methods for providing component condition assessment are disclosed. The first method uses the high definition camera 13 with image detection to take images of specific components. The images are analyzed using image analysis to identify high risk conditions or component degradation. Comparison of current images against previously captured images enables this process. The second method uses the electromagnetic interference detection system 20 to identify discharge activity such as corona and arcing. Once the information obtained from the two methods is received, the information is processed and transmitted via the communications and control system 16 to personnel for repair. The personnel can then be deployed to address the activity using day-time discharge cameras. Infrared and day-time discharge cameras may also be integrated into the robot 10. The GPS 22 provides the location of any component issues to a system operator or repair personnel.

Figure 12:
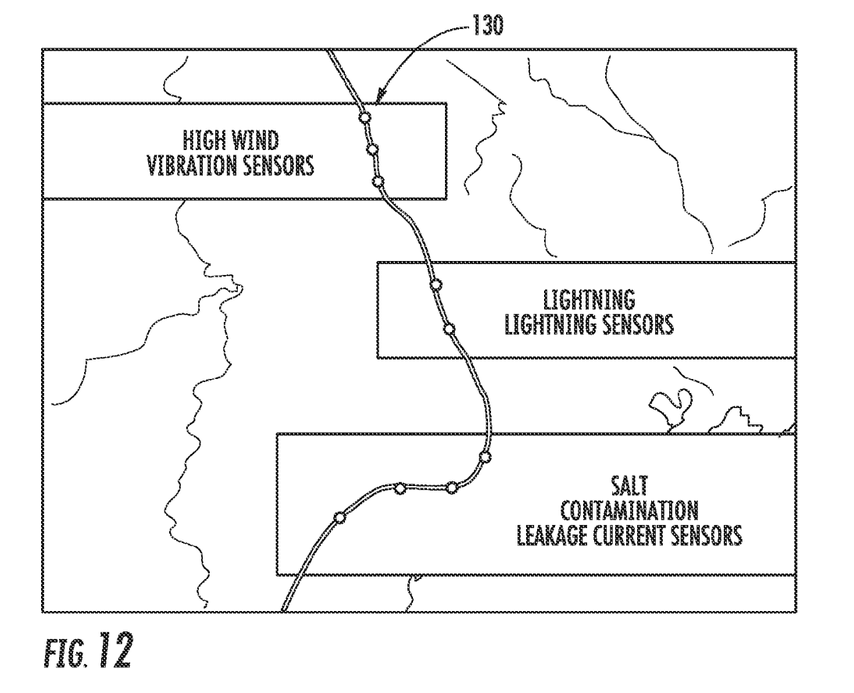
FIG. 12 shows a robot and sensor system according to an embodiment of the invention.
Figure 13:
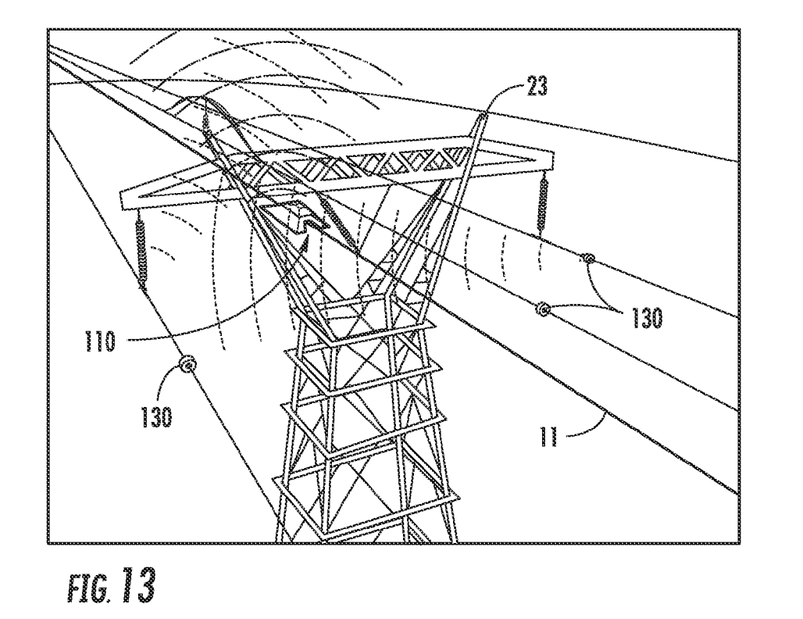
FIG. 13 shows an inspection robot receiving and transmitting information from sensors of the system of FIG. 12.

As shown in FIGS. 12 and 13, a robot and sensor system according to an embodiment of the invention is shown generally at reference numeral 100. The system 100 includes a robot 110 and a plurality of strategically placed sensors (for example, RF sensors) 130 positioned along transmission lines. The robot 100 includes all of the technologies associated with robot 10, i.e., high definition camera 113, LiDar sensor 114, communications and control system 116 having an antenna 117, sensor reading system 118 having an antenna 119, electromagnetic interference detection system 120 having an antenna 121, GPS 122.

The system 100 may be implemented to monitor and inspect overhead transmission lines and to continually assess concerns with components such as insulators, conductors, and compression connectors. For example, the sensors 130 would be deployed in areas of significant environmental stress or where specific component types have been installed. Deployed sensors 130 continually collect data, thereby developing histograms and determining maximum values. The historical results and the present measurements are transmitted to the robot 110, as shown in FIG. 13, when it is in close proximity to the sensors 130 for analysis. While the system 100 has been discussed in reference to the robot 110, it should be appreciated, that the sensors 130 may also be used in conjunction with ground crews, helicopters, and other inspection methods capable of receiving the data from the sensors 130. Further, it should be appreciated that a local base station may be installed to continuously monitor and collect data from the sensors 130.

The system 100 allows remotely located staff to obtain detailed, up-to-date knowledge of transmission line component and right of way conditions, thereby increasing reliability while reducing operations and maintenance costs.

The foregoing has described a line inspection robot and system. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. An overhead transmission line inspection robot, comprising:
   (a) a communications and control system configured to control the robot and transmit information;
   (b) a drive system configured to propel the robot along a shield wire to enable inspection over a large area, the drive system having:
      (i) a center guide configured to ride along a top of the shield wire; and
      (ii) a plurality of wheels pivotally connected to the center guide and configured to ride along opposing sides of the shield wire, each of the plurality of wheels being pivotally connected to the center guide by an arm, wherein the arm is configured to enable independent operation of each of the wheels and allow each wheel to move inwardly towards or outwardly away from a centerline of the shield wire;
   (c) a camera configured to inspect right of way and component conditions;
   (d) a light detection and ranging sensor configured to measure conductor position, vegetation, and nearby structures; and
   (e) a global positioning system configured to identify the robot's position and speed.

2. The overhead transmission line inspection robot according to claim 1, further including a sensor reading system to collect data from remote sensors deployed at various locations.

3. The overhead transmission line inspection robot according to claim 1, further including an electromagnetic interference detection system to identify nearby corona or arcing discharge activity.

4. The overhead transmission line inspection robot according to claim 1, wherein each of the plurality of wheels are spring-loaded to bias the wheels towards engagement with opposing sides of the shield wire.

5. The overhead transmission line inspection robot according to claim 1, further including a solar panel for harvesting energy and recharging the robot.

6. An overhead transmission line inspection system, comprising:
   (a) a line inspection robot, having:
      (i) a communications and control system configured to control the robot and transmit information;
      (ii) a drive system configured to propel the robot along a shield wire and enable inspection over a large area, the drive system having a plurality of spring-loaded wheels pivotally connected to a center guide, each of the wheels being independently connected to the center guide to enable independent operation of each of the wheels; and
      (iii) an inspection system configured to inspect right of way and component conditions;
   (b) a diverter system installed on support structures configured to allow the robot to traverse the structures, the diverter system having a plurality of track supports configured to allow the robot to disengage the shield wire, traverse the structure, and reengage the shield wire, wherein when the robot engages the diverter system, each of the wheels disengages the shield wire to allow the robot to be transferred onto the diverter system, as the robot progresses onto the diverter system, the drive system expands such that a first set of the plurality of wheels ride along an outer most track and a second set of the plurality of wheels ride along an inner most track while the center guide rides along a center track of the diverter system.

7. The overhead transmission line inspection system according to claim 6, wherein the track supports merge together at opposing ends of the diverter system to allow connection to the shield wire at each of the opposing ends and allow the robot to disengage and reengage the shield wire.

8. The overhead transmission line inspection system according to claim 6, wherein the inspection system includes:
   (a) a camera adapted to inspect right of way and component conditions; and
   (b) a light detection ranging sensor adapted to measure conductor position, vegetation, and nearby structures.

9. The overhead transmission line inspection system according to claim 6, wherein when the robot disengages the diverter system and reengages the shield wire, the drive system contracts such that the first set of wheels, second set of wheels, and center guide ride along the shield wire.

10. An overhead transmission line inspection system, comprising:
   (a) a line inspection robot configured to inspect an overhead transmission line and having a drive system configured to propel the robot along a shield wire and enable inspection over a large area, the drive system including:
      (i) a center guide configured to ride along a top of the shield wire; and
      (ii) a plurality of wheels pivotally connected to the center guide and configured to ride along opposing sides of the shield wire, each of the plurality of wheels being pivotally connected to the center guide by an arm, wherein the arm is configured to enable independent operation of each of the wheels and allow each wheel to move inwardly towards or outwardly away from a centerline of the shield wire; and
   (b) a plurality of sensors positioned along the overhead transmission line, wherein the sensors collect data on the health of the overhead transmission line and its components, and wherein when the robot is in close proximity to one of the plurality of sensors, the sensor transmits the data to the robot for analysis.

11. The overhead transmission line inspection system according to claim 10, wherein the robot includes a sensor reading system to collect the data being transmitted by the sensors.

12. The overhead transmission line inspection system according to claim 10, wherein the robot includes a communications system to transmit the collected data to a systems operator.

13. The overhead transmission line inspection system according to claim 10, wherein the robot includes a global positioning system to identify the robot's location and thereby the location of the sensor that is transmitting the data to allow operators to locate problem areas.

\* \* \* \* \*